(12) United States Patent
Tsumura

(10) Patent No.: US 7,680,225 B2
(45) Date of Patent: Mar. 16, 2010

(54) RECEIVING APPARATUS AND C/N RATIO INDICATION METHOD THEREOF

(75) Inventor: Masayuki Tsumura, Tokyo (JP)

(73) Assignee: Sony Corporation (JP)

( * ) Notice: Subject to any disclaimer, the term of this patent is extended or adjusted under 35 U.S.C. 154(b) by 1333 days.

(21) Appl. No.: 10/533,630

(22) PCT Filed: Nov. 19, 2003

(86) PCT No.: PCT/JP03/14698

§ 371 (c)(1),
(2), (4) Date: May 2, 2005

(87) PCT Pub. No.: WO2004/055998

PCT Pub. Date: Jul. 1, 2004

(65) Prior Publication Data

US 2005/0289606 A1    Dec. 29, 2005

(30) Foreign Application Priority Data

Nov. 26, 2002  (JP)  ............................. 2002-341772

(51) Int. Cl.
*H03D 1/04* (2006.01)
(52) U.S. Cl. .................. 375/346; 348/193; 348/570; 348/725; 725/72; 375/329; 375/343; 375/323
(58) Field of Classification Search ............. 375/322, 375/340, 341, 324, 346, 345, 269, 273, 283, 375/323, 327, 329, 371, 279, 362, 355, 308, 375/334, 343, 375, 141, 233–236; 455/3.02, 455/427, 226.3, 226.4; 708/5, 8, 21, 404; 329/348–350, 307; 348/193, 569, 570, 725; 725/72
See application file for complete search history.

(56) References Cited

U.S. PATENT DOCUMENTS

| | | | | | |
|---|---|---|---|---|---|
| 5,999,027 A | * | 12/1999 | Yamazaki | .................... | 327/161 |
| 6,940,923 B2 | * | 9/2005 | Ohishi | ........................ | 375/326 |
| 2002/0050953 A1 | * | 5/2002 | Fang | .......................... | 343/703 |

FOREIGN PATENT DOCUMENTS

| JP | 2000-138722 | * | 5/2000 |
|---|---|---|---|
| JP | 2003-348030 | * | 12/2003 |

\* cited by examiner

*Primary Examiner*—David C Payne
*Assistant Examiner*—Rahel Guarino
(74) *Attorney, Agent, or Firm*—Lerner, David, Littenberg, Krumholz & Mentlik, LLP

(57) ABSTRACT

It is determined whether phase noise and parasitic oscillation take place on the basis of a carrier-to-noise (C/N) ratio calculated with amplitudes in an amplitude direction of signal points of a reception signal and a C/N ratio calculated with amplitudes in a phase direction of the signal points of the reception signal. Further, when it has been determined that phase noise and parasitic oscillation take place, an alarm is displayed on a screen. When it has been determined that phase noise and parasitic oscillation take place, the phase of a demodulation circuit is compensated based on the detected phase noise.

3 Claims, 6 Drawing Sheets

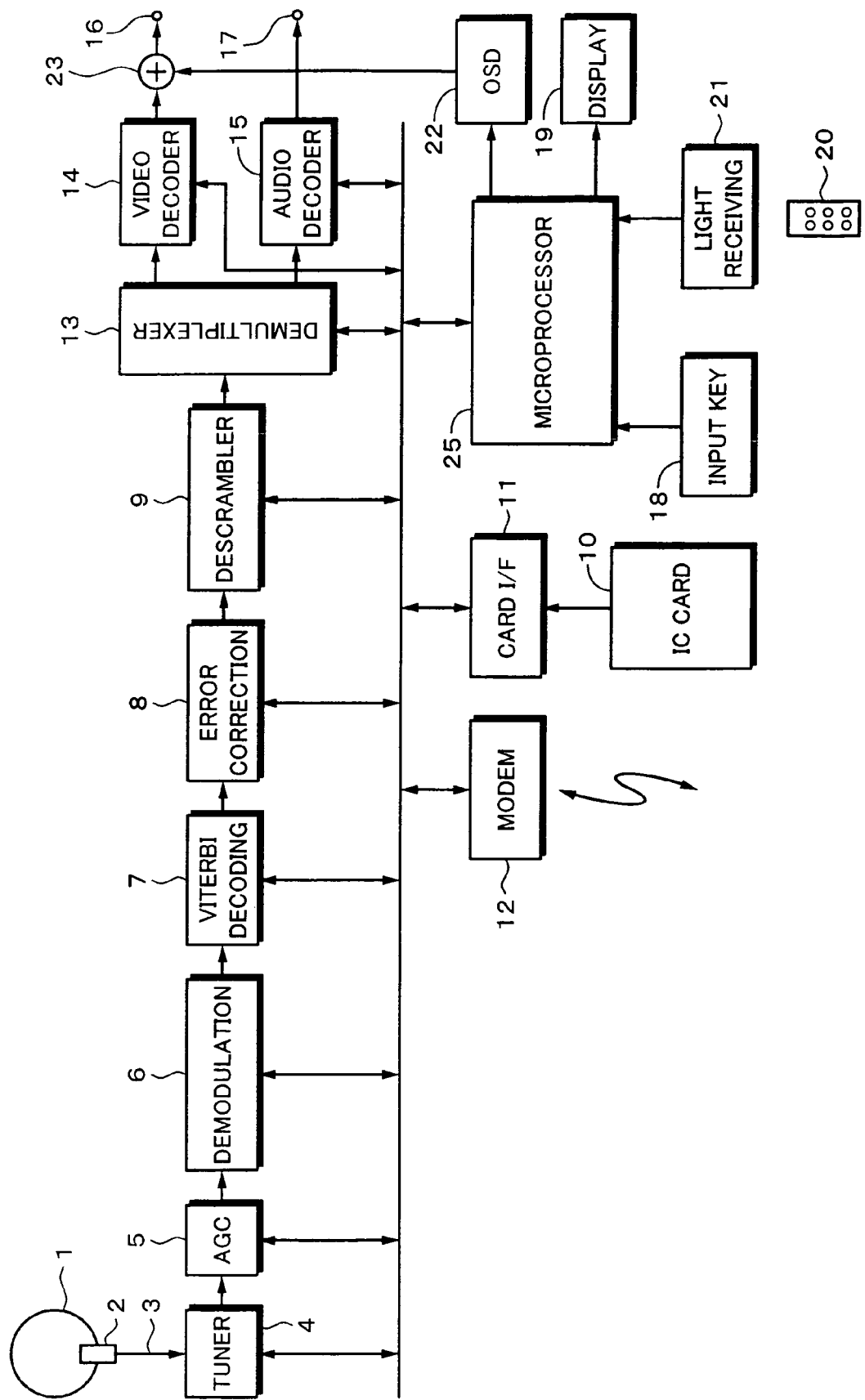

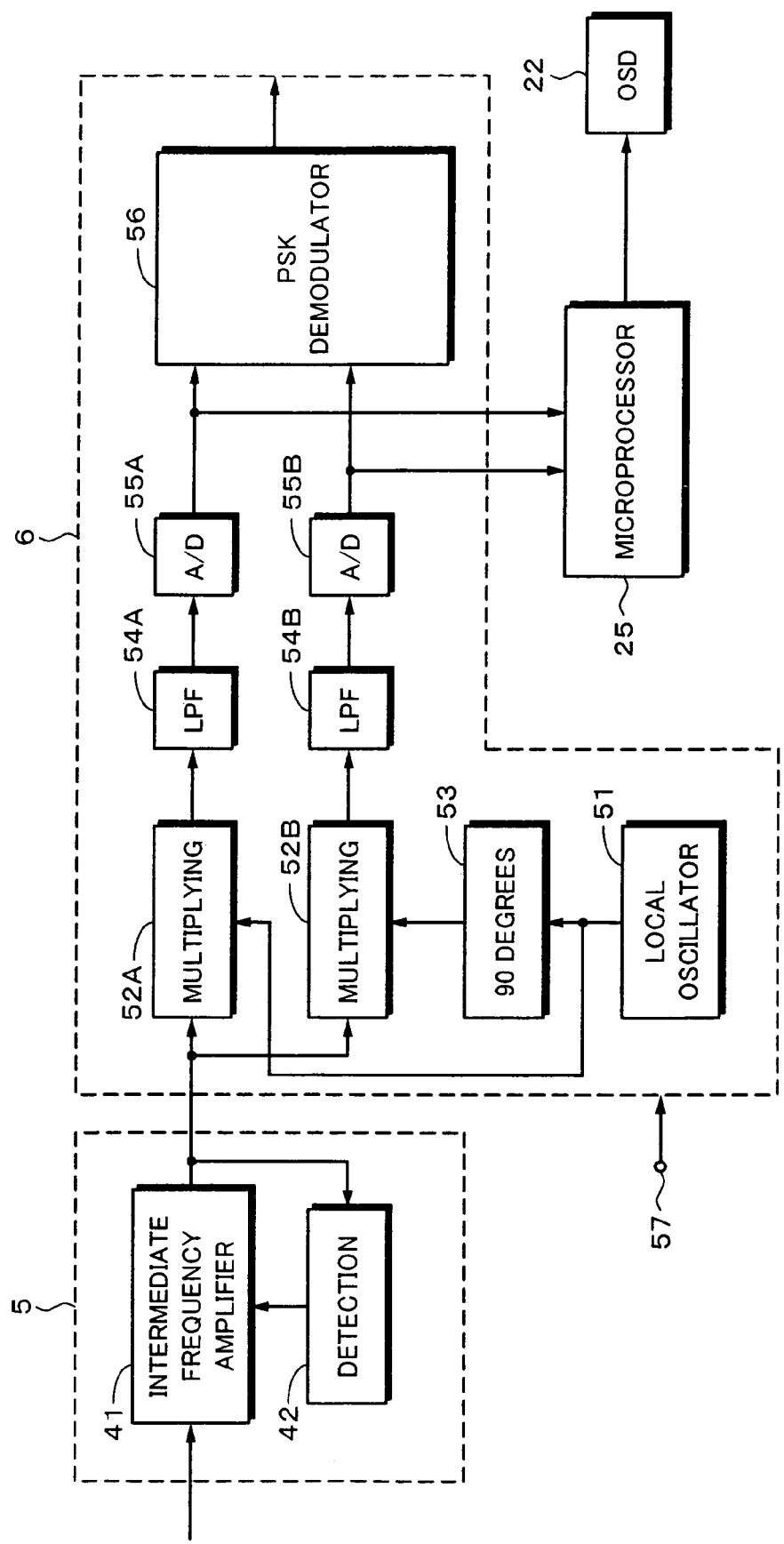

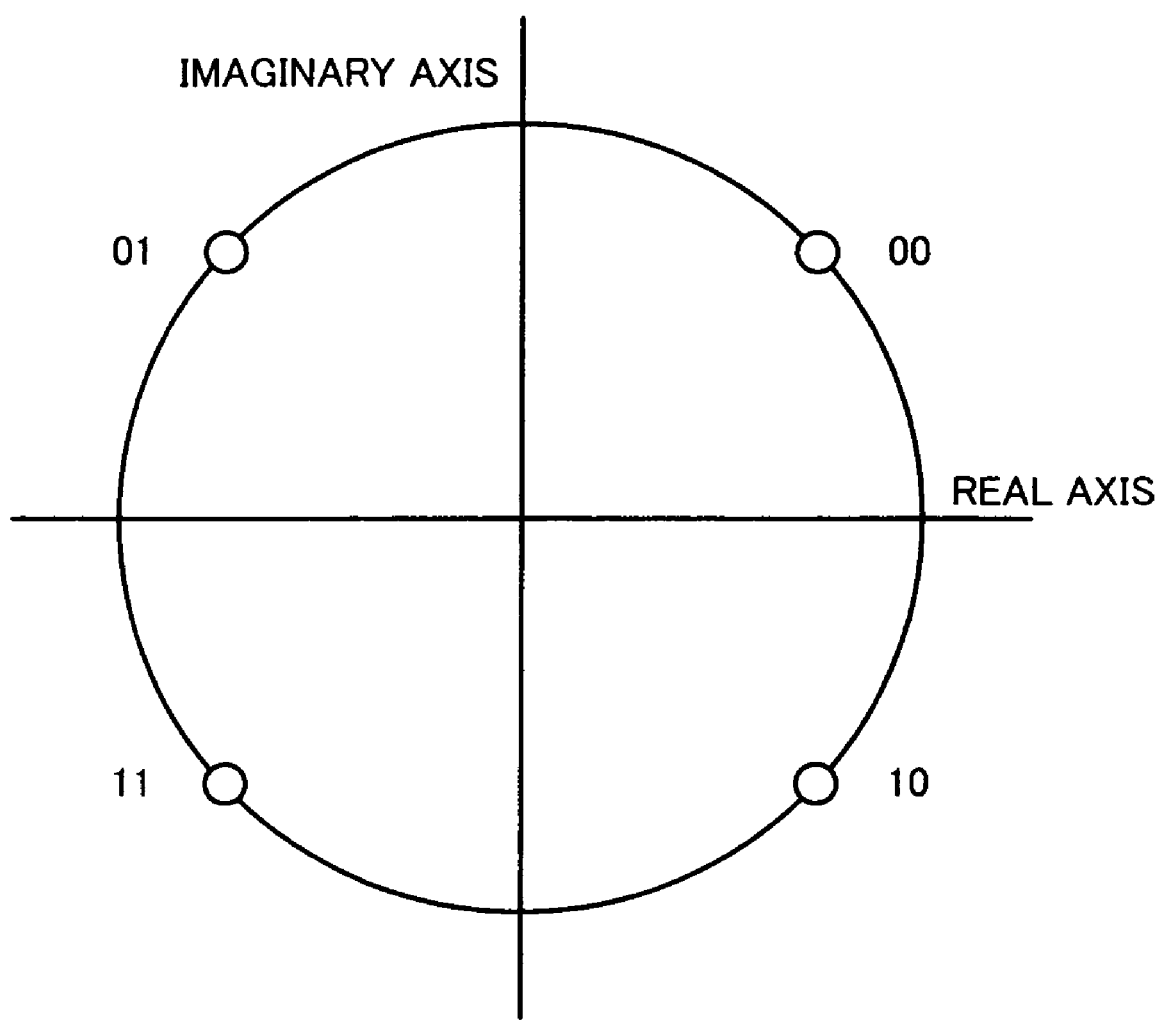

US 7,680,225 B2

RECEIVING APPARATUS AND C/N RATIO INDICATION METHOD THEREOF

TECHNICAL FIELD

The present invention relates to a receiving apparatus that receives a digital satellite broadcast and to a C/N ratio indication method of the receiving apparatus, the method being is used to adjust an antenna level or the like.

BACKGROUND ART

A satellite broadcast tuner, a television receiver that has an internal satellite broadcast tuner, and so forth have an antenna level indication function that indicates the C/N (Carrier to Noise) ratio of a reception signal received from a satellite by an antenna. The antenna level indication function is used for example to adjust the direction of an antenna that is installed.

In the satellite broadcast, a parabola antenna that has a sharp directivity is used to receive a signal from the satellite. Thus, after the antenna has been installed, the direction of the antenna should be adjusted.

When the antenna is installed, the C/N ratio of the reception signal is displayed on the screen of for example a television receiver with the antenna level indication function. While the direction of the parabola antenna is being moved, the antenna level is checked so that the value of the antenna level becomes the maximum. After the direction of the antenna has been adjusted, when the value of the antenna level is equal to or larger than a predetermined C/N ratio, the satellite broadcast can be received.

The receiving apparatuses of the related art accomplishes the reception level indication function on the basis of the gain of an AGC (Automatic Gain Control) amplifier. In other words, an intermediate frequency amplifier stage of the satellite broadcast receiving apparatus has an AGC circuit that causes the level of the received signal to be constant. The AGC circuit detects the reception signal and the level thereof and sets the gain of the amplifier of the intermediate frequency amplifier stage corresponding to the level of the reception signal. Assuming that noise contained in the reception signal is white noise, since the signal level of the reception signal represents the C/N ratio, it can be detected from an output of the AGC circuit. The C/N ratio obtained from the output of the AGC circuit is indicated as an antenna level.

The receiving apparatus of the related art detects a C/N ratio with a detected output of the AGC circuit and indicates the C/N ratio as an antenna level. However, in particular, when a digital satellite broadcast receiving apparatus that uses a digital modulation system detects a C/N ratio with a detected output of an AGC circuit, even if an indicated antenna level is equal to or larger than a predetermined C/N ratio, the apparatus may not obtain a satisfying reception state.

In other words, an antenna that receives a digital satellite broadcast has an LNB (Low Noise Block Down Converter) that converts a reception signal of 12 GHz band into an intermediate frequency signal of 1 GHz band. The LNB often generates phase noise and parasitic oscillation. Since the digital satellite broadcast uses a phase modulation such as BPSK (Binary Phase Shift Keying), QPSK (Quadrature Phase Shift Keying), 8PSK (8-phase PSK), or the like, if the LNB generates phase noise and parasitic oscillation, the receiving apparatus does not obtain a satisfying reception state.

The receiving apparatus of the related art indicates an antenna level with a C/N ratio detected as an output of an AGC circuit. The apparatus detects the C/N ratio assuming that the output of the AGC circuit is white noise. Thus, the C/N ratio detected in the apparatus does not reflect phase noise. Thus, when the apparatus receives a digital satellite broadcast that has been phase modulated, even if the antenna level is equal to or larger than a predetermined C/N ratio, the apparatus may not be able to obtain a satisfying reception state.

If a satisfying reception state is not obtained due to phase noise and parasitic oscillation, when the phase of a demodulation circuit of the receiving apparatus is compensated (the bands of loop filters and a dumping factor are adjusted), the reception state can be improved.

However, the receiving apparatus of the related art does not indicate values that represents phase noise and parasitic oscillation. Thus, it is difficult to compensate the phase of the demodulation circuit. In other words, since the values of the phase noise and the parasitic oscillation are not indicated, while the picture quality of a reproduced picture is being evaluated, the phase of the demodulation circuit of the receiving apparatus should be compensated so that the picture quality becomes optimum. Adjusting the phase of the demodulation circuit while evaluating the picture quality needs skills.

A method that deals with phase noise is described in for example Japanese Patent Laid Open Publication No. 2000-13705.

The satellite broadcast receiving apparatus of the related art measures the C/N ratio of a reception signal with a detected output of an AGC circuit assuming that noise contained in the reception signal is white noise and indicates the C/N ratio as an antenna level. Thus, if phase noise and parasitic oscillation take place, even if the indicated antenna level is equal to or larger than the predetermined C/N ratio, the receiving apparatus may not obtain a satisfying reception state. In this case, it is difficult to identify which of the receiving apparatus side and the antenna side has a problem. Thus, the reception fault may not be correctly handled. As a result, the user may be confused with them.

When a satisfying reception state is not obtained due to phase noise and parasitic oscillation, although the phase of the demodulation circuit of the receiving apparatus may be compensated, since the receiving apparatus of the related art does not indicate the values of phase noise and parasitic oscillation, it is difficult to compensate the phase of the demodulation circuit. In addition, once the phase of the demodulation circuit has been compensated corresponding to the LNB that generates phase noise and parasitic oscillation, if the LNB is replaced with another one that has low phase noise and does not generate parasitic oscillation, the reception state may more deteriorate than with the former LNB.

Therefore, an object of the present invention is to provide a receiving apparatus and a C/N ratio indication method thereof that allow phase noise and parasitic oscillation to be detected, deterioration of the reception state due to phase noise and parasitic oscillation to be alerted, a reception defect to be properly handled, and the user to be prevented from becoming confused.

DISCLOSURE OF THE INVENTION

Claim 1 of the present invention is a receiving apparatus, comprising:

demodulation means for demodulating a reception signal to a signal on a real axis and a signal on an imaginary axis;

C/N ratio calculation means for calculating a C/N ratio with the amplitudes in an amplitude direction of signal points of the demodulation signal demodulated by said demodulation means and a C/N ratio with the amplitudes in a phase direction of the signal points of the demodulation signal demodulated by said demodulation means;

phase noise detection means for detecting phase noise on the basis of the C/N ratio calculated with the amplitudes in the amplitude direction and the C/N ratio calculated with the amplitudes in the phase direction; and indication means for indicating the C/N ratios calculated by said C/N ratio calculation means and the phase noise detected by said phase noise detection means.

Claim 5 of the present invention is a C/N ratio indication method for a receiving apparatus, the method comprising the steps of:

demodulating a reception signal to a signal on a real axis and a signal on an imaginary axis;

calculating a C/N ratio with the amplitudes in an amplitude direction of signal points of the demodulation signal demodulated by said demodulation means and a C/N ratio with the amplitudes in a phase direction of the signal points of the demodulation signal demodulated by said demodulation means;

determining whether phase noise takes place on the basis of the C/N ratio calculated with the amplitudes in the amplitude direction and the C/N ratio calculated with the amplitudes in the phase direction; and indicating the C/N ratios calculated by said C/N ratio calculation means and the phase noise detected by said phase noise detection means.

It is determined whether phase noise and parasitic oscillation take place on the basis of the C/N ratio calculated with the amplitude in the amplitude direction of a signal point of a reception signal and the C/N ratio calculated with the amplitude in the phase direction of the signal point of the reception signal. When it has been determined that phase noise and parasitic oscillation take place, an alarm is displayed on the screen.

When it has been determined that phase noise and parasitic oscillation take place, the phase of the demodulation circuit is compensated on the basis of the C/N ratio calculated with the amplitude in the amplitude direction of a signal point of the reception signal and the C/N ratio calculated with the amplitude in the phase direction of the signal point of the reception signal.

BRIEF DESCRIPTION OF DRAWINGS

FIG. 1 is a block diagram showing an example of a satellite broadcast receiving apparatus according to the present invention.

FIG. 2 is a block diagram describing an indication of an C/N ratio of the satellite broadcast receiving apparatus according to the present invention.

FIG. 3 is a schematic diagram describing the arrangement of signal points on a complex plane of the QPSK modulation.

BEST MODES FOR CARRYING OUT THE INVENTION

Figure 4A:
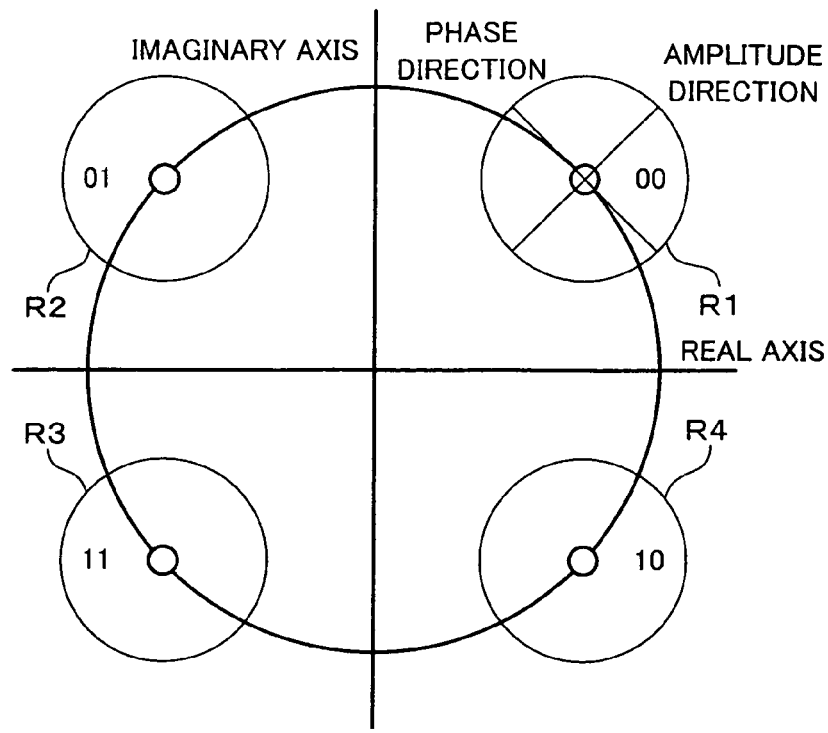
FIG. 4A and FIG. 4B are schematic diagrams describing a constellation that represents dispersion of signals points when noise takes place.

Next, with reference to the accompanying drawings, an embodiment of the present invention will be described. FIG. 1 shows an example of a digital BS broadcast receiving apparatus according to the present invention. In FIG. 1, a radio wave of 12 GHz band of a digital satellite broadcast is transmitted from a satellite and received by a parabola antenna 1. An LNB (Low Noise Block Down Converter) 2 mounted on the parabola antenna 1 converts the radio wave into a first intermediate frequency signal of for example 1 GHz band. An output of the LNB 2 is supplied to a tuner circuit 4 through a cable 3.

A tuning signal is supplied from a microprocessor 25 to the tuner circuit 4. The tuner circuit 4 selects a desired carrier frequency signal from the reception signal on the basis of the tuning signal supplied from the microprocessor 25. The tuner circuit 4 converts the selected carrier frequency signal into a second intermediate frequency signal.

The intermediate frequency signal is supplied from the tuner circuit 4 to an AGC circuit 5. The AGC circuit 5 amplifies the intermediate frequency signal supplied from the tuner circuit 4. In addition, the AGC circuit 5 controls the gain of the intermediate frequency signal so that the signal level thereof becomes constant. An output of the AGC circuit 5 is supplied to a demodulation circuit 6.

The demodulation circuit 6 performs demodulation processes corresponding to the BPSK (Binary Phase Shift Keying), QPSK (Quadrature Phase Shift Keying), and 8PSK (8-phase PSK).

In the digital BS broadcast, signals are hierarchically transmitted corresponding to the BPSK, QPSK, and 8PSK. In the 8PSK modulation, although the amount of information per symbol is large, when a signal is deteriorated by rain, the error rate deteriorates. On the other hand, in the BPSK and QPSK, although the amount of information per symbol is small, even if a signal is deteriorated by rain, the error rate does not remarkably deteriorate.

The transmission side correlates one TS packet with one slot and maps TS packets to a frame composed of 48 slots. Each slot can be allocated a modulation system and an encoding system. The type of the modulation system allocated to each slot and the coding ratio are transmitted with a TMCC (Transmission and Multiplexing Configuration Control) signal. Each super frame is composed of eight frames. Each slot is interleaved.

The demodulation circuit 6 demodulates a transport stream. An output of the demodulation circuit 6 is supplied to a Viterbi decoding circuit 7. The Viterbi decoding circuit 7 performs an error correction process for a demodulation signal with an inner code. An output of the Viterbi decoding circuit 7 is supplied to an error correction circuit 8. The error correction circuit 8 performs an error correction process for a decoded signal with an outer code.

The digital BS broadcast uses an error correction code encoding system having an outer code of Reed-Solomon code (204, 188) and an inner code of Trellis code or convolutional code. The Viterbi decoding circuit 7 performs an error correction process for a demodulated signal with an inner code. The error correction circuit 8 performs an error correction process for a decoded signal with an outer code as Reed-Solomon code.

An output of the error correction circuit 8 is supplied to a descrambler 9. The descrambler 9 controls a CAS (Conditional Access System).

In other words, in the CAS reception, a transport stream has been encrypted. Personal information is stored in an IC card 10. The IC card 10 is attached to the receiving apparatus through a card interface 11.

Information of received ECM (Encryption Control Message) and EMM (Entitlement Management Message) sections is supplied to the descrambler 9. In addition, descramble key data stored in the IC card 10 are supplied to the descrambler 9. In the CAS reception, the descrambler 9 descrambles a transport stream with the received ECM and EMM and the information of the IC card 10.

In addition, the receiving apparatus has a modem 12. Charging information is sent to a broadcast center for the program through the modem 12 and a telephone line.

The transport stream descrambled by the descrambler 9 is sent to a demultiplexer 13.

The demultiplexer 13 separates desired packets from the received transport stream. A header portion of each packet describes a packet identifier (PID). The demultiplexer 13 separates video PES (Packetized Elementary Stream) packets, audio PES packets, data packets, PSI (Program Specific Information) packets, and SI (Specific Information) packets of a desired program from the transport stream on the basis of the PID.

The video PES packets of the desired program are sent to a video decoder 14. The audio PES packets are sent to an audio decoder 15. The data packets and PSI and SI packets are sent to the microprocessor 25.

The video decoder 14 receives the video PES packets from the demultiplexer 13, decodes the video PES packets corresponding to the MPEG (Moving Picture Coding Experts Group) 2 system, and reproduces a video signal. The reproduced video signal is output from an output terminal 16.

The audio decoder 15 receives the audio PES packets from the demultiplexer 13, decodes the audio PES packets corresponding to the MPEG2-AAC (MPEG2 Advanced Coding) system, and forms an audio signal. The reproduced audio signal is output from an output terminal 17.

An operation input is performed with an input key 18. The input key 18 is for example various keys and switches disposed on the panel of the receiving apparatus. Alternatively, an operation input may be performed with an infrared ray remote controller 20. The receiving apparatus has a light receiving portion 21 that receives rays of an infrared ray command signal from the infrared ray remote controller 20. The signal received by the light receiving portion 21 is sent to the microprocessor 25.

A display portion 19 displays various set states. The display portion 19 is for example a liquid crystal display and LED (Light Emitting Diode) devices mounted on the panel. In addition, a display signal is supplied from the microprocessor 25 to an OSD (On Screen Display) circuit 22. An output of the OSD circuit 22 and a video signal are combined by an adding device 23. Thus, various set states can be superimposed with received pictures.

FIG. 2 shows an example of an C/N level indication circuit according to the present invention. In FIG. 2, a reception signal is output through the AGC circuit 5. An output of the AGC circuit 5 is supplied to the demodulation circuit 6. The AGC circuit 5 is composed of a detection circuit 42 and an intermediate frequency amplifier 41. The detection circuit 42 detects the level of the reception signal. The AGC circuit 5 controls the gain of the intermediate frequency amplifier 41 corresponding to the level of the reception signal so that the level of the reception signal becomes constant.

The demodulation circuit 6 has a local oscillator 51, multiplying devices 52A and 52B, a 90-degree phase shifter 53, low-pass filters 54A and 54B, A/D converters 55A and 55B, and a PSK demodulator 56. The local oscillator 51, the multiplying devices 52A and 52B, and the 90-degree phase shifter 52 form an orthogonal detection circuit.

The local oscillator 51 outputs a carrier signal reproduced from the reception signal. An output of the local oscillator 51 is supplied to the multiplying device 52A. In addition, the output of the local oscillator 51 is supplied to the multiplying device 52B through the 90-degree phase shifter 53.

The multiplying device 52A multiplies the reception signal by the carrier signal received from the local oscillator 51. The multiplying device 52B multiplies the reception signal by a carrier signal whose phase has been shifted by 90 degrees. The multiplying devices 52A and 52B output a signal component on the real axis and a signal component on the imaginary axis. Outputs of the multiplying devices 52A and 52B are supplied to the low-pass filters 54A and 54B, respectively. The low-pass filters 54A and 54B remove unnecessary band components. Outputs of the low-pass filters 54A and 54B are supplied to the A/D (Analog to Digital) converters 55A and 55B, respectively. The A/D converters 55A and 55B convert the signal component on the real axis and the signal component on the imaginary axis into their digital signal components, respectively. Outputs of the A/D converters 55A and 55B are supplied to the PSK demodulator 56.

The PSK demodulator 56 maps the signal components that have been A/D converted on the real axis and the imaginary axis to a complex plane. A digital signal is demodulated with codes allocated to the mapped signal points. The demodulated digital signal is output as a transport stream.

A phase compensation signal is supplied from an input terminal 57 to the demodulation circuit 6. With the phase compensation signal, the phase of the demodulation circuit 6 can be compensated corresponding to phase noise. When phase noise takes place in the reception signal, the bands of filters and a dumping factor (the bands of the low-pass filters 54A and 54B, the characteristics of the local oscillator 51, and so forth) are set on the basis of the phase compensation signal supplied form the input terminal 57.

The demodulated data on the real axis and the imaginary axis are supplied from the A/D converters 55A and 55B to the microprocessor 25. The microprocessor 25 calculates a C/N ratio with the amplitude in the amplitude direction of a signal point of the reception signal and the amplitude in the phase direction of the signal point of the reception signal. The microprocessor 25 determines whether phase noise and parasitic oscillation take place with the C/N ratio calculated with the amplitude in the amplitude direction of the signal point of the reception signal and the amplitude in the phase direction of the signal point of the reception signal. The calculated C/N ratio is displayed on the screen by the OSD circuit 22. When it has been determined that phase noise and parasitic oscillation take place, an alarm that represents that phase noise and parasitic oscillation take place is displayed on the screen by the OSD circuit 22.

As described above, the bands of the filters of the demodulation circuit 6 and the dumping factor can be set corresponding to the phase compensation signal received from the input terminal 57. When it has been determined that phase noise and parasitic oscillation take place, they can be handled by compensating the phase of the demodulation circuit 6.

When it has been detected that phase noise and parasitic oscillation take place with the C/N ratio calculated with the amplitude in the amplitude direction of the signal point of the reception signal and the C/N ratio calculated with the amplitude in the phase direction of the signal point of the reception signal, the phase of the demodulation circuit 6 is compensated. In other words, when it has been detected that phase noise and parasitic oscillation take place, with the phase compensation signal received from the input terminal 57, the phase of the demodulation circuit 6 is compensated.

Thus, in the receiving apparatus according to the present invention, it is determined whether phase noise and parasitic oscillation take place with the C/N ratio calculated with the amplitude in the amplitude direction of a signal point of the reception signal and the C/N ratio calculated with the amplitude in the phase direction of the signal point of the reception signal. Next, how noise and parasitic oscillation can be detected with the C/N ratio calculated with the amplitude in the amplitude direction of a signal point of the reception signal and the C/N ratio calculated with the amplitude in the phase direction of the signal point of the reception signal will be described.

As described above, the digital BS broadcast is hierarchically transmitted by the BPSK, QPSK, and 8PSK. In these phase modulations, phases represent information. FIG. 3 shows signal points mapped on a complex plane in the QPSK modulation. In the QPSK, there are signal points at 45 degrees, 135 degrees, 225 degrees, and 315 degrees on the circumference.

Figure 4B:
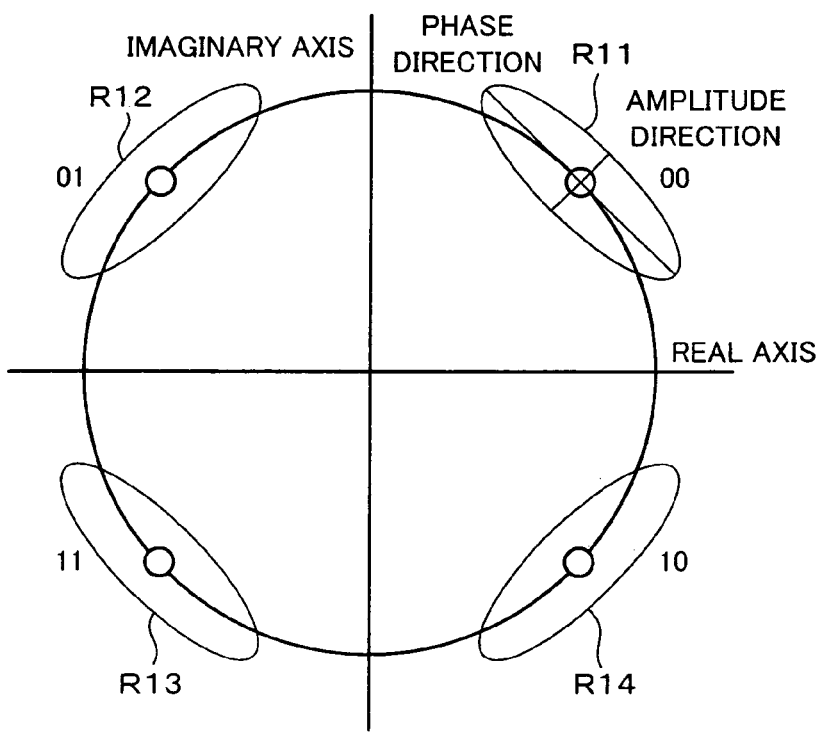

On the other hand, signal points received by the receiving apparatus disperse around them as shown in FIG. 4A and FIG. 4B. Signal points mapped on the complex plane are referred to as a constellation.

When the signal intensity to noise (C/N ratio) is large, signal points of the reception signal match signal points of the original signal. The radii of circles R1 to R4 of the constellation that represent the distribution of the reception signal become small. In contrast, when the signal intensity to noise (C/N ratio) is low, the signal points of the reception signal spread against the signal points of the original signal. Thus, the radii of the constellation that represent the distribution of the reception signal becomes large. As a result, when the radii of the constellation that represent the distribution of the reception signal, the amplitudes of the signal points of the reception signal and the signal points of the original signal are detected, the C/N ratio can be obtained.

When the reception signal is not affected by phase noise and parasitic oscillation, as shown in FIG. 4A, the signal points of the reception signal normally distribute against the signal points of the original signal. Thus, the signal points of the reception signal distribute as circles R1 to R4 of the constellation. When the C/N ratio is low, although the radii of the constellation that represent the distribution of the reception signal become large, the signal points are kept in circles in the constellation.

On the other hand, when phase noise and parasitic oscillation take place, the signal points of the reception signal distribute as ellipses R11 to R14 in the constellation as shown in FIG. 4B.

Thus, when the amplitudes in the amplitude direction of the signal points of the reception signal are compared with the amplitudes in the phase direction of the signal points of the reception signal, it can be determined whether phase noise and parasitic oscillation take place.

When the amplitudes in the amplitude direction of the signal points of the reception signal are almost the same as the amplitudes in the phase direction of the signal points of the reception signal, it can be determined that phase noise and parasitic oscillation do not take place. When the amplitudes on the real axis of the signal points of the reception signal are different from the amplitudes on the imaginary axis of the signal points of the reception signal, it can be determined that phase noise and parasitic oscillation take place.

Figure 5:
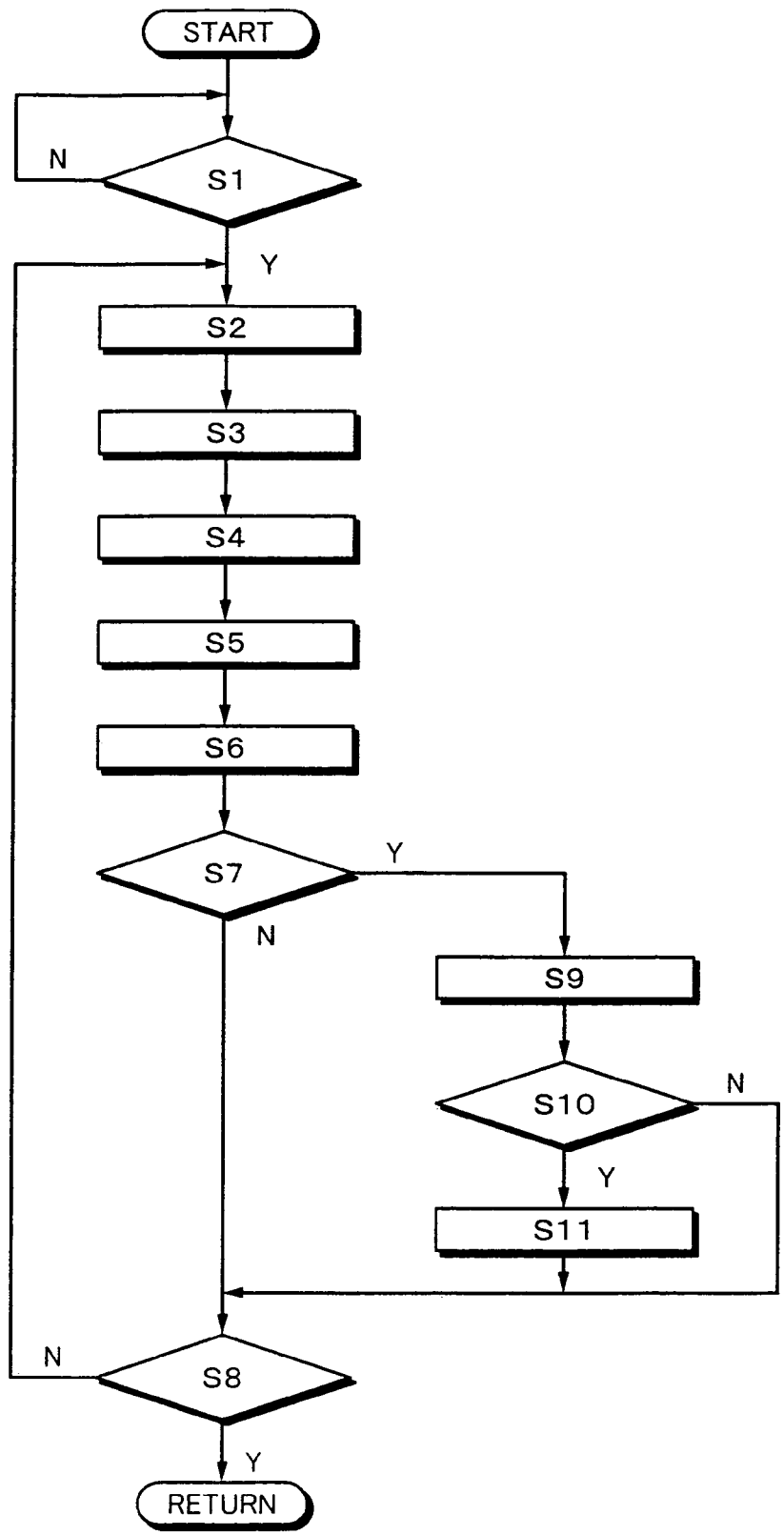
FIG. 5 is a flow chart describing an indication of a C/N ratio of the satellite broadcast receiving apparatus according to the present invention.

FIG. 5 is a flow chart showing a process that detects phase noise and parasitic oscillation on the basis of the C/N ratio calculated with the amplitudes in the amplitude direction of signal points of the reception signal and the C/N ratio calculated with the amplitudes in the phase direction of the signal points of the reception signal and causes the OSD circuit 22 to indicate an alarm on the screen when it has been determined that phase noise and parasitic oscillation take place.

In FIG. 5, it is determined whether an antenna level indication mode has been set (at step S1). When the antenna level indication mode has been set, a satellite broadcast is received (at step S2). With the demodulated output on the real axis of the reception signal and the demodulated output on the imaginary axis of the reception signal, the amplitudes in the amplitude direction of the signal points of the reception signal and the amplitudes in the phase direction of the signal points of the reception signal are detected (at step S3).

With the amplitudes in the amplitude direction of the signal points of the reception signal and the amplitudes in the phase direction of the signal points of the reception signal, the C/N ratio (CN_R) and the C/N ratio (CN_I) are calculated (at step S4). The obtained C/N ratios (CN_R, CN_I) of the reception signal are displayed on the screen (at step S5). The C/N ratio (CN_I) calculated with the amplitudes in the phase direction of the signal points of the reception signal does not always need to be displayed.

The C/N ratio (CN_R) calculated with the amplitudes in the amplitude direction of the signal points of the reception signal and the C/N ratio (CN_I) calculated with the amplitudes in the phase direction of the signal points of the reception signal are compared. As a result, phase noise and parasitic oscillation are detected (at step S6). With the deference between the C/N ratio (CN_R), calculated with the amplitudes in the amplitude direction of the signal points of the reception signal, and the C/N ratio (CN_I), calculated with the amplitudes in the phase direction of the signal points of the reception signal, namely, CN_R-CN_I, it is determined whether phase noise and parasitic oscillation that are equal to or larger than predetermine values take place (at step S7).

In other words, when the absolute value of the difference (CN_R-CN_I) between the C/N ratio (CN_R), calculated with the amplitudes in the amplitude direction of the signal points of the reception signal, and the C/N ratio (CN_I), calculated with the amplitudes in the phase direction of the signal points of the reception signal, are not larger than a predetermined value, it is determined that phase noise and parasitic oscillation that are equal to or larger than the predetermined values do not take place. When the absolute value of the difference (CN_R-CN_I) between the C/N ratio (CN_R), calculated with the amplitudes in the amplitude direction of the signal points of the reception signal, and the C/N ratio (CN_I), calculated with the amplitudes in the phase direction of the signal points of the reception signal, exceeds the predetermined value, it is determined that phase noise and parasitic oscillation that are equal to or larger than the predetermined values take place.

When it has been determined that phase noise and parasitic oscillation that are equal to or larger than the predetermined values does not take place, it is determined whether the antenna level indication mode has been turned off (at step S8). When the antenna level indication mode has not been turned off, the flow returns to step S2. At step S2, the C/N ratios are displayed. When the antenna level indication mode has been turned off, the regular reception screen is displayed.

When it has been determined that phase noise and parasitic oscillation that are equal to or larger than the predetermined values take place, an alarm that represents that phase noise and parasitic oscillation take place is displayed (at step S9). At this point, it is determined whether to compensate the phase of the demodulation circuit 6 (at step S10). When it has been determined that the phase of the demodulation circuit 6 be compensated, the phase of the demodulation circuit 6 is compensated. The phase of the demodulation circuit 6 may be manually compensated by the user. Alternatively, the phase of the demodulation circuit 6 may be automatically compensated. When the phase of the demodulation circuit 6 is manually compensated, if it has been determined that phase noise and parasitic oscillation take place, a screen on which the user compensates the phase of the demodulation circuit 6 may be displayed. When the phase of the demodulation circuit 6 is automatically compensated, the phase of the demodulation circuit 6 may be compensated corresponding to the amount of phase noise generated.

Thereafter, it is determined whether the antenna level indication mode has been turned off (at step S8). Unless the antenna level indication mode has been turned off, the flow returns to step S2. At step S2, the C/N ratios are displayed. When the antenna level indication mode has been turned off, the normal reception screen is displayed.

Figure 6:
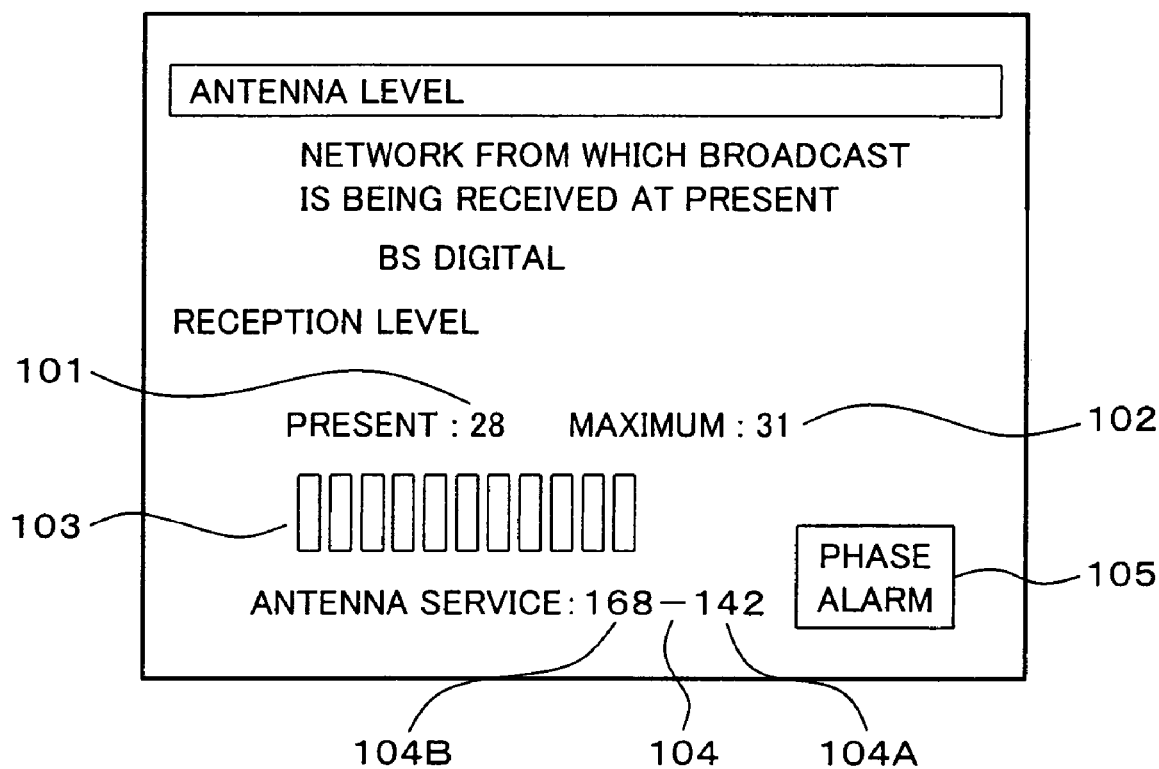
FIG. 6 is a schematic diagram showing an example of C/N ratios indicated on the satellite broadcast receiving apparatus according to the present invention.

FIG. 6 shows an example of indications of C/N ratios on the screen by the OSD circuit 22 of the receiving apparatus shown in FIG. 1. When the receiving apparatus is set to the antenna level set mode with the input key 18 or the remote controller 20, a screen that displays an indicator 101 that indicates a present reception level, an indicator 102 that indicates the maximum value of reception levels that have taken place until now, a bar indicator 103 that indicates a reception level, and an indicator 104 that indicates an antenna service. When phase noise and parasitic oscillation that are equal to or larger than the predetermined values take place, an alarm indicator 105 is displayed.

The indicator 101, which indicates the present reception level, and the indicator 102, which indicates the maximum value of the reception levels that have taken place until now, indicate the level of the C/N ratio calculated with the amplitudes in the amplitude direction of the reception signal. The indicators 101 and 102 indicate values that are twice larger than the decibel values of the C/N ratios so that the user can easily recognize the value. When the indicator 101 is "28," it represents that the C/N ratio is 14 dB. The bar indicator 103, which indicates the reception level, indicates the C/N ratio calculated with the amplitudes in the amplitude direction with bars.

The indicator 104, which indicates the antenna service, is composed of an indicator 104A that indicates the present value of the C/N ratio calculated with the amplitudes in the phase direction of the reception signal and an indicator 104B that indicates the maximum value. These values are used for a reference with which the user can determine whether phase noise and parasitic oscillation take place. The values of the indicator 104 are ten times larger than the decibel values of the C/N ratios. For example, when the indicator 104A is "142," it indicates that the C/N ratio is 14.2 dB.

When it has been detected that phase noise and parasitic oscillation that are equal to or larger than the predetermined values, the alarm indicator 105 is displayed. It is determined whether phase noise and parasitic oscillation take place with the difference between the level of the C/N ratio calculated with the amplitudes on the real axis of the reception signal and the level of the C/N ratio calculated with the amplitudes in the phase direction of the reception signal. When the difference between the level of the C/N ratio calculated with the amplitudes in the amplitude direction of the reception signal and the level of the C/N ratio calculated with the amplitudes in the phase direction of the reception signal is equal to or larger than the predetermined values, the alarm indicator 105, which indicates that phase noise and parasitic oscillation take place, is displayed.

The alarm indicator 105 may be displayed with characters or an icon that indicates an alarm. Alternatively, the alarm indicator 105 may be displayed with a different color. When phase noise and parasitic oscillation take place, the indicators 101 and 102, which indicate the C/N ratios, and the antenna service indicator 104 may be displayed with a different color.

In the foregoing example, the indicators 101 and 102, which indicates the C/N rates, indicate values twice larger than the C/N ratios of the reception level. The indicator 104, which indicates the antenna service, indicates a value 10 times larger than the C/N ratio of the reception level. However, it should be noted that the indications of the C/N ratios are not limited to those examples. In other words, the C/N ratios may be indicated with 10 levels from "1" to "10." Alternatively, the decibel values of the C/N ratios may be indicated as they are.

As described above, in the receiving apparatus according to the present invention, it is determined whether phase noise and parasitic oscillation take place on the basis of the C/N ratio calculated with the amplitudes in the amplitude direction of the signal points of the reception signal and the C/N ratio calculated with the amplitudes in the phase direction of the signal points of the reception signal. When it has been determined that phase noise and parasitic oscillation take place, the OSD circuit 22 displays an alarm on the display.

When phase noise and parasitic oscillation take place, even if the C/N ratio of the reception signal is sufficiently large, a picture may not be satisfactorily reproduced. In this case, unless an alarm that represents that phase noise and parasitic oscillation take place is displayed, the user is unable to know in what reason the picture is not satisfactorily reproduced. However, in the receiving apparatus according to the present invention, since an alarm that represents that phase noise and parasitic oscillation take place is displayed, if a picture is not satisfactorily reproduced because phase noise and parasitic oscillation take place, the user can correctly recognize the cause.

In addition, in the receiving apparatus according to the present invention, when it has been determined that phase noise and parasitic oscillation take place, the phase of the demodulation circuit 6 is adjusted on the basis of phase noise obtained with the C/N ratio calculated with the amplitudes in the amplitude direction of the signal points of the reception signal and the C/N ratio calculated with the amplitudes in the phase direction of the signal points of the reception signal. In other words, when phase noise takes place in the LNB 2, the phase of the demodulation circuit 6 is adjusted so that the phase noise is compensated. Thus, the phase of the demodulation circuit can be optimally adjusted.

In the foregoing example, phase noise is displayed on the screen by the OSD. Alternatively, phase noise may be indicated with an LED or the like disposed in the indicator portion of the panel.

In the foregoing example, when the absolute value of the difference between the C/N ratio calculated with the amplitudes in the amplitude direction of the signal points of the reception signal and the C/N ratio calculated with the amplitudes in the phase direction of the signal points of the reception signal is equal to or larger than the predetermined value, an alarm that represents that phase noise and parasitic oscillation take place is displayed. Alternatively, phase noise may be displayed with a numeric value. When phase noise is displayed with a numeric value, the user can optimally compensate the phase of the demodulation circuit while observing the numeric value displayed as phase noise.

It should be understood by those skilled in the art that various modifications, combinations, sub-combinations and alternations may occur depending on design requirements and other factors insofar as they are within the scope of the appended claims or the equivalents thereof.

According to the present invention, it is determined whether phase noise and parasitic oscillation take place on the basis of the C/N ratio calculated with the amplitudes in the amplitude direction of the signal points of the reception signal and the C/N ratio calculated with the amplitudes in the phase direction of the signal points of the reception signal. When it has been determined that phase noise and parasitic oscillation take place, an alarm is displayed on the screen. Since the alarm that represents that phase noise and parasitic oscillation take place is displayed, if a picture is not satisfactorily reproduced, the user can correctly recognize the cause.

When it has been determined that phase noise and parasitic oscillation take place, the phase of the demodulation circuit is adjusted on the basis of phase noise obtained with the C/N ratio calculated with the amplitudes in the amplitude direction of the signal points of the reception signal and the C/N ratio calculated with the amplitudes in the phase direction of the signal points of the reception signal. Thus, the phase of the demodulation circuit can be optimally adjusted.

The invention claimed is:

1. A receiving apparatus, comprising:
   demodulation means for demodulating a reception signal to a signal on a real axis and a signal on an imaginary axis;
   carrier-to-noise (C/N) ratio calculation means for calculating a C/N ratio with amplitudes in an amplitude direction of signal points of the reception signal demodulated by said demodulation means and a C/N ratio with amplitudes in a phase direction of the signal points of the reception signal demodulated by said demodulation means;
   phase noise detection means for detecting phase noise based on the C/N ratio calculated with the amplitudes in the amplitude direction and the C/N ratio calculated with the amplitudes in the phase direction;
   indication means for indicating the C/N ratios calculated by said C/N ratio calculation means;
   a display unit to display the phase noise detected by the phase noise detection means based on the C/N ratio calculated with the amplitudes in the amplitude direction and the C/N ratio calculated with the amplitudes in the phase direction as a numeric value; and
   an alarm indicator which provides an indication to a user when the phase noise detected based on the C/N ratio calculated with the amplitudes in the amplitude direction and the C/N ratio calculated with the amplitudes in the phase direction is equal to or larger than a predetermine value.

2. The receiving apparatus as set forth in claim 1,
   wherein said demodulation means comprises phase compensation means for compensating a phase with an external compensation signal, and
   wherein when the phase noise takes place, said phase compensation means compensates the phase.

3. A carrier-to-noise (C/N) ration indication method for a receiving apparatus, the method comprising the steps of:
   demodulating a reception signal to a signal on a real axis and a signal on an imaginary axis by use of demodulation means;
   calculating a C/N ratio with amplitudes in an amplitude direction of signal points of the reception signal demodulated by said demodulation means and a C/N ratio with amplitudes in a phase direction of the signal points of the reception signal demodulated by said demodulation means;
   determining whether phase noise takes place based on the C/N ratio calculated with the amplitudes in the amplitude direction and the C/N ratio calculated with the amplitudes in the phase direction;
   indicating the C/N ratios calculated by the calculating step;
   displaying the phase noise determined by the determining step based on the C/N ratio calculated with the amplitudes in the amplitude direction and the C/N ratio calculated with the amplitudes in the phase direction on a display unit as a numeric value; and
   providing an indication to a user by use of an alarm indicator when the phase noise determined based on the C/N ratio calculated with the amplitudes in the amplitude direction and the C/N ratio calculated with the amplitudes in the phase direction is equal to or larger than a predetermine value.

* * * * *